Aug. 4, 1936.          H. W. WALTERS          2,050,138
                       LIFESAVING APPARATUS
                       Filed Aug. 4, 1933          3 Sheets-Sheet 2
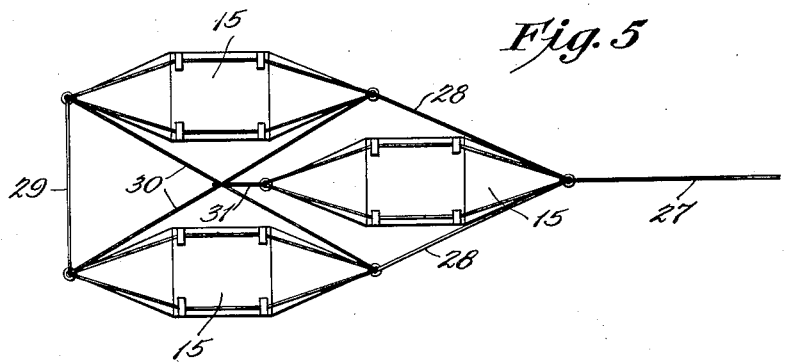
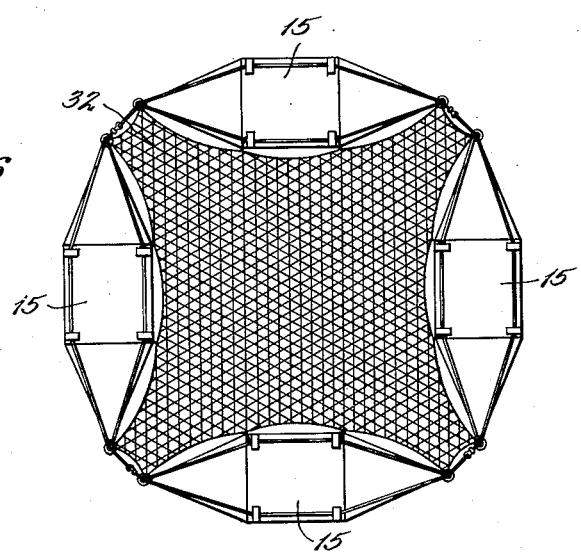
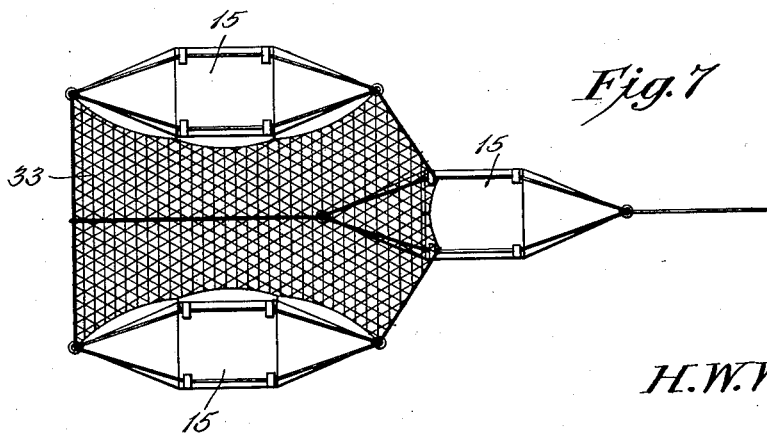
Inventor
H. W. Walters
By Philip E. Liggers, Attorney Aug. 4, 1936.  H. W. WALTERS  2,050,138
LIFESAVING APPARATUS
Filed Aug. 4, 1933   3 Sheets-Sheet 3
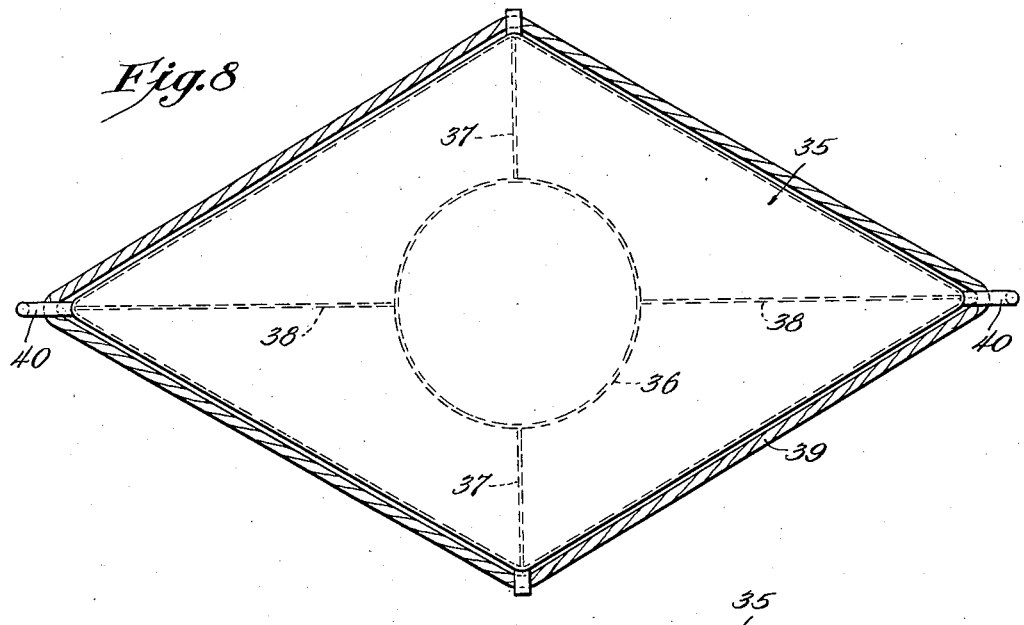
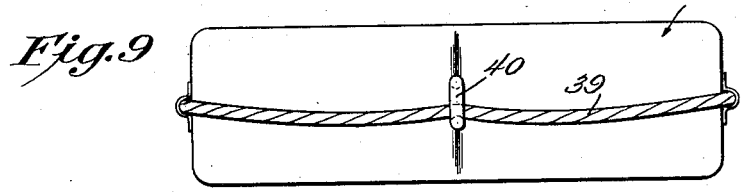
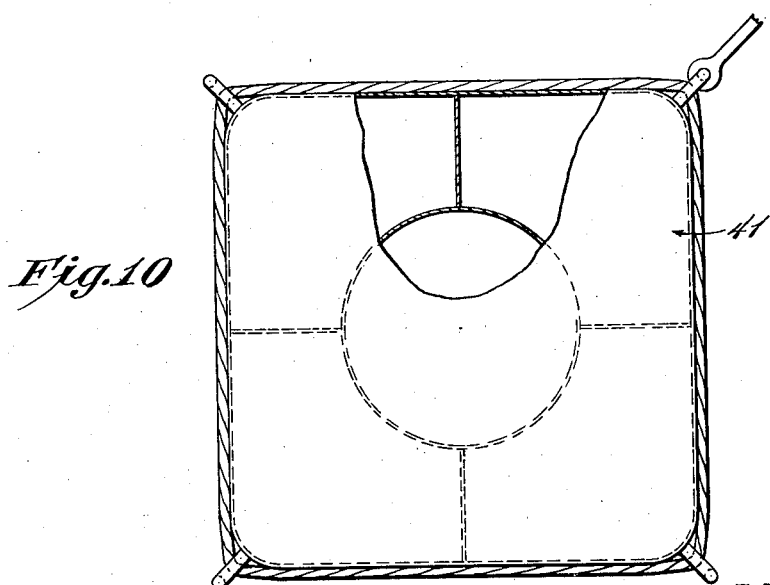
Inventor
H. W. Walters
By
Philip P. Siggers  Attorney Patented Aug. 4, 1936

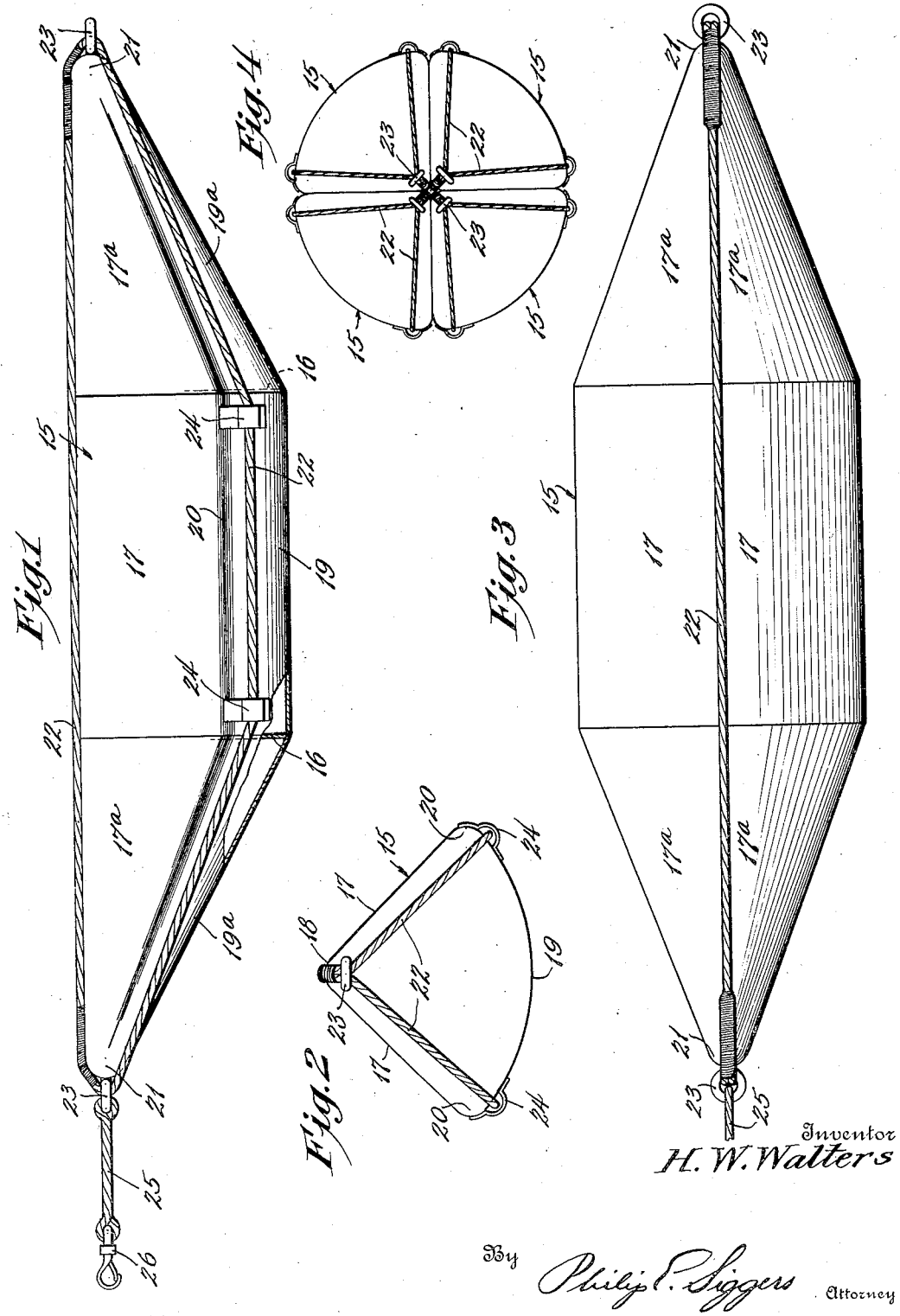

2,050,138

UNITED STATES PATENT OFFICE 2,050,138

LIFESAVING APPARATUS

Henry W. Walters, Jacksonville, Fla.

Application August 4, 1933, Serial No. 683,686

4 Claims. (Cl. 9—14)

This invention relates to life saving apparatus, and among other objects, aims to provide serviceable, buoyant apparatus which may be towed, propelled or thrown to a drowning person, which will support a number of persons, providing, if desired, a life-raft, and which may be stored in confined spaces such as those available in boats, air-craft etc. The invention provides numerous improvements over the apparatus described and claimed in my Patent No. 1,403,362 dated January 10, 1922.

In the accompanying drawings showing embodiments of my invention,—

Fig. 1 is a side elevation of a buoy made in the manner preferred by me;

Fig. 2 is an end elevation thereof;

Fig. 3 is a plan view of the same;

Fig. 4 is an end view showing how four of the buoys may be laid together to save shipping or storage space;

Fig. 5 is a plan view showing a life-raft made from three of the buoys;

Fig. 6 is a plan view of a life-raft made from four of the buoys and a net;

Fig. 7 is a plan view of another life-raft, made from three of the buoys and a net;

Fig. 8 is a plan view of a lozenge-shaped buoy, showing in dotted lines the interior walls providing a number of water-tight compartments;

Fig. 9 is an end elevation of the buoy of Fig. 8; and

Fig. 10 is a plan view of a square buoy, with part of the top wall broken to expose the interior walls which provide a number of water-tight compartments within the buoy.

Referring first to Figs. 1, 2, and 3, the buoy or buoyant element there shown is a hollow body 15 made of any suitable material which is light and which resists the corrosive action of fresh and salt water and the damp atmosphere which prevails over large bodies of water. As shown in Fig. 1, within the body are two baffles 16 dividing the interior into three water-tight compartments. The central part of the body is generally triangular in cross-section, with two side walls 17 which are plane, meeting in a rounded corner 18, and an arcuate wall 19 meeting the plane walls 17 in rounded corners 20. The two end portions of the body taper to rounded points 21, but are also substantially triangular in cross-section, each with two plane walls 17$^a$ and an arcuate wall 19$^a$. To permit the buoy to be grasped by a person struggling in the water, ropes 22 extend the entire length thereof, there being at least three lengths of ropes, and the ropes being held against displacement by eyelets or end rings 23 and guides 24 welded or otherwise made fast to the body. A short length of rope 25 may be secured to one of the end rings and a swiveled hook 26 attached to the outer end of rope 25 may secure it to the end of a similar buoy.

The described buoy is preferred above all the other forms known to me because it is very light, very easy to tow through water, sustains a considerable weight, yet stows away in a small space, a feature which is most important if the buoy is carried in boats or hydroplanes. The pointed ends are particularly advantageous when stowing the buoys in lockers adjacent the prow of a small boat. Fig. 4 shows how four of the buoys may be laid together, when stored, saving a great deal of space. If desired, four of the buoys placed together as in Fig. 4 may be temporarily or permanently united to make a unitary buoy of large body-supporting capacity. Ropes passed through and knotted about the four rings at each end will suffice to hold the four buoys together, as will be clear from Fig. 4.

The described buoy may be flexibly connected with other buoys to form life saving apparatus capable of sustaining a large number of people. In the arrangement shown in Fig. 5, three of the buoys 15 are connected by ropes in such a manner that one of the buoys is between and in advance of the other two, all three being kept substantially parallel to each other. The foremost buoy 15 has a lead line 27 attached to its forward end, and two side lines 28 also attached to that end and to the forward ends of the two buoys to the rear. The rear ends of the rear buoys are connected together by a line 29. Two crossing lines 30 extend diagonally from the forward end of each rear buoy to the rear end of the opposite rear buoy, and a short line 31 connects the rear end of the foremost buoy with the two crossing lines 30 at the point where they cross. It will be clear that a single length of rope, or two or more lengths, may be used instead of a plurality of lines described herein.

In Fig. 6 there is shown four of the buoys 15 flexibly connected together to form a buoyant ring which with the net 32, which is attached to the several buoys, forms a life saving device capable of being stored in a small space, yet capable of sustaining a large number of persons in the water. Obviously the net 32 performs one of the functions of the ropes 28, 29, 30 (in the form of Fig. 5) which will directly support a number of people; and equally obviously, the form of Fig. 6 has greater life-saving capacity because one more buoy is used.

Fig. 7 shows an arrangement of three of the buoys 15 analogous to that of Fig. 5, but instead of a series of lines connecting the three buoys, a net 33 joins them flexibly and maintains them in the same relative positions as in Fig. 5.

Figs. 8 and 9 show a lozenge-shaped buoy 35 having a circular partition wall 36 and four straight walls 37, 38 dividing its interior into five water-tight compartments. A rope 39 is attached to the outside of the buoy and an attaching ring 40 at each end permits several of the buoys 35 to be connected together exactly like buoys 15 are shown connected in Figs. 5, 6, and 7. The form of Figs. 8 and 9 is less preferable because it does not glide through the water so readily as the form of Figs. 1–3, nor does it occupy such a small space when stowed away.

Fig. 10 shows a square buoy 41 having partitions similar to the partitions 36, 37, 38, in Fig. 8. This form of buoy is still less desirable from the standpoint of resistance offered in moving through water, but on the other hand it may be more adaptable to certain storage spaces available on boats, especially on the decks of large vessels, than the other described forms. It may be connected to other similar buoys in the manner illustrated in Figs. 5, 6, and 7.

The several forms of buoys which I have described are by no means all the forms which may embody my invention; hence I do not wish to be limited to buoys having any particular shape, except as required by the appended claims as interpreted in the light of the prior art.

Obviously various arrangements of buoys other than the ones shown and described are within the scope of the present invention.

Having described the invention, what I claim as new and desire to secure by Letters Patent is:

1. A buoy comprising a hollow buoyant body with four side walls, a top and a bottom; a rope strung around said side walls; and a means to attach the buoy to another buoy; the interior of the body being subdivided into at least five watertight, non-communicating compartments by means of a cylindrical wall extending from the top to the bottom on the inside, and four walls extending from the exterior of said cylindrical wall radially outwardly to the interior surfaces of the four side walls, and also extending from the top to the bottom on the inside.

2. Life saving apparatus comprising, in combination, three elongated, pointed buoys connected together by ropes so that one is in advance of the other two and is between the other two; a rope connecting the front end of the foremost buoy with the front ends of the two rear buoys; and flexible means providing the sole means for connecting the two rear buoys at both their front and rear ends and also connecting the rear end of the front buoy with the two rear buoys, so that bodies between said rear buoys will be supported by all three buoys in the water.

3. Life saving apparatus comprising, in combination, three elongated buoys arranged so that one is in advance of and between the other two; a rope connected to the former end of the foremost buoy; other ropes connecting the foremost buoy to the rear buoys, other ropes connecting the rear buoys to each other; and another rope connecting the rear end of the foremost buoy with the ropes which connect the rear buoys together, so that said buoys are usually substantially parallel.

4. Life saving apparatus comprising, in combination, three buoys connected together by ropes so that one is in advance of the other two and is between the other two; a rope attached to the forward end of the foremost buoy; other ropes connecting the foremost buoy with the forward ends of the two rear buoys; and a net connected to the three buoys and closing the space between them, said net and ropes being the sole means of preventing separation of the buoys, and thus permitting approach of the buoys so as to unitedly support a non-buoyant body lying on the net.

HENRY W. WALTERS.